(12) United States Patent
Kobayashi et al.

(10) Patent No.: US 11,705,852 B2
(45) Date of Patent: Jul. 18, 2023

(54) MOTOR DRIVING DEVICE AND ELECTRIC OIL PUMP DEVICE

(71) Applicant: NIDEC TOSOK CORPORATION, Kanagawa (JP)

(72) Inventors: Yoshiyuki Kobayashi, Kanagawa (JP); Yasuhiro Shirai, Kanagawa (JP); Tadayuki Hatsuda, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 351 days.

(21) Appl. No.: 17/017,708

(22) Filed: Sep. 11, 2020

(65) Prior Publication Data

US 2021/0099125 A1    Apr. 1, 2021

(30) Foreign Application Priority Data

Sep. 30, 2019    (JP) ................. 2019-180048

(51) Int. Cl.
| | |
|---|---|
| H02P 6/10 | (2006.01) |
| H02P 21/32 | (2016.01) |
| H02P 29/68 | (2016.01) |
| F04D 15/00 | (2006.01) |
| F04D 13/06 | (2006.01) |

(52) U.S. Cl.
CPC ............. *H02P 29/68* (2016.02); *F04D 13/06* (2013.01); *F04D 15/00* (2013.01)

(58) Field of Classification Search
CPC ............. H02P 21/24; H02P 6/18; B60L 58/15
See application file for complete search history.

(56) References Cited

U.S. PATENT DOCUMENTS

| | | | |
|---|---|---|---|
| 2013/0149170 A1 | 6/2013 | Song et al. | |
| 2014/0229052 A1* | 8/2014 | Takizawa | B60W 20/10 701/22 |
| 2017/0232950 A1* | 8/2017 | Nishimine | B60W 20/00 701/22 |
| 2018/0010595 A1* | 1/2018 | Goto | F04B 49/065 |

FOREIGN PATENT DOCUMENTS

JP        2013122310        6/2013

* cited by examiner

*Primary Examiner* — Kawing Chan
*Assistant Examiner* — Charles S Laughlin
(74) *Attorney, Agent, or Firm* — JCIPRNET

(57) ABSTRACT

A motor driving device for driving a motor is provided. The motor driving device includes: a driver outputting a drive signal for driving the motor to the motor; and a controller controlling a duty ratio of the drive signal based on three control parameters which are an initial duty ratio, a duty ratio increasing speed, and a target duty ratio. The controller has a normal control mode in which each of the three control parameters is a predetermined value, and a cryogenic control mode in which at least one of the three control parameters is a smaller value than in the normal control mode.

7 Claims, 4 Drawing Sheets

MOTOR DRIVING DEVICE AND ELECTRIC OIL PUMP DEVICE

CROSS-REFERENCE TO RELATED APPLICATIONS

The present invention claims priority under 35 U.S.C. § 119 to Japanese Application No. 2019-180048, filed on Sep. 30, 2019, the entire content of which is incorporated herein by reference.

FIELD OF THE INVENTION

The disclosure relates to a motor driving device and an electric oil pump device.

BACKGROUND

A hybrid vehicle includes a mechanical oil pump provided inside a transmission, and an electric oil pump that is able to be operated independently of the driving of an engine. In such a hybrid vehicle, the hydraulic pressure required for the transmission is supplied by the electric oil pump when the engine is not driven.

There is a conventional control method for controlling a motor driving device in the electric oil pump when the oil temperature of the transmission is in a cryogenic state where the temperature is equal to or less than a predetermined reference temperature. This control method is to measure the oil temperature of the transmission, and perform duty control so that the rotation speed of the electric oil pump reaches a target rotation speed when the oil temperature of the transmission is in the cryogenic state equal to or less than the predetermined reference temperature, and perform feedback control to maintain the target rotation speed after the duty control.

However, in the state of an extremely low temperature of −10° C. or less, the viscosity of the oil becomes extremely high compared with that in a normal temperature state. Therefore, for the conventional motor driving device, when duty control is performed in the state where the oil has high viscosity to bring the rotation speed of the electric oil pump to the target rotation speed, the load torque of the motor increases. As a result, the output current value output from the motor driving device to the motor rises. The motor driving device is provided with a fail-safe function for stopping the current supply to the motor when the output current value exceeds an upper limit value. Therefore, if the output current value of the motor driving device rises due to the high viscosity of the oil as described above, the fail-safe function may apply and make it impossible to drive the motor and supply the required hydraulic pressure.

SUMMARY

According to an exemplary embodiment of the disclosure, a motor driving device for driving a motor includes: a driver outputting a drive signal for driving the motor to the motor; and a controller controlling a duty ratio of the drive signal based on three control parameters which are an initial duty ratio, a duty ratio increasing speed, and a target duty ratio. The controller has a normal control mode in which each of the three control parameters is a predetermined value, and a cryogenic control mode in which at least one of the three control parameters is a smaller value than in the normal control mode.

According to an exemplary embodiment of the disclosure, an electric oil pump device includes: a motor including a shaft; a pump located on one axial side of the shaft and driven by the motor via the shaft to discharge oil; and the motor driving device driving the motor.

The above and other elements, features, steps, characteristics and advantages of the present disclosure will become more apparent from the following detailed description of the preferred embodiments with reference to the attached drawings.

DETAILED DESCRIPTION

Figure 1:
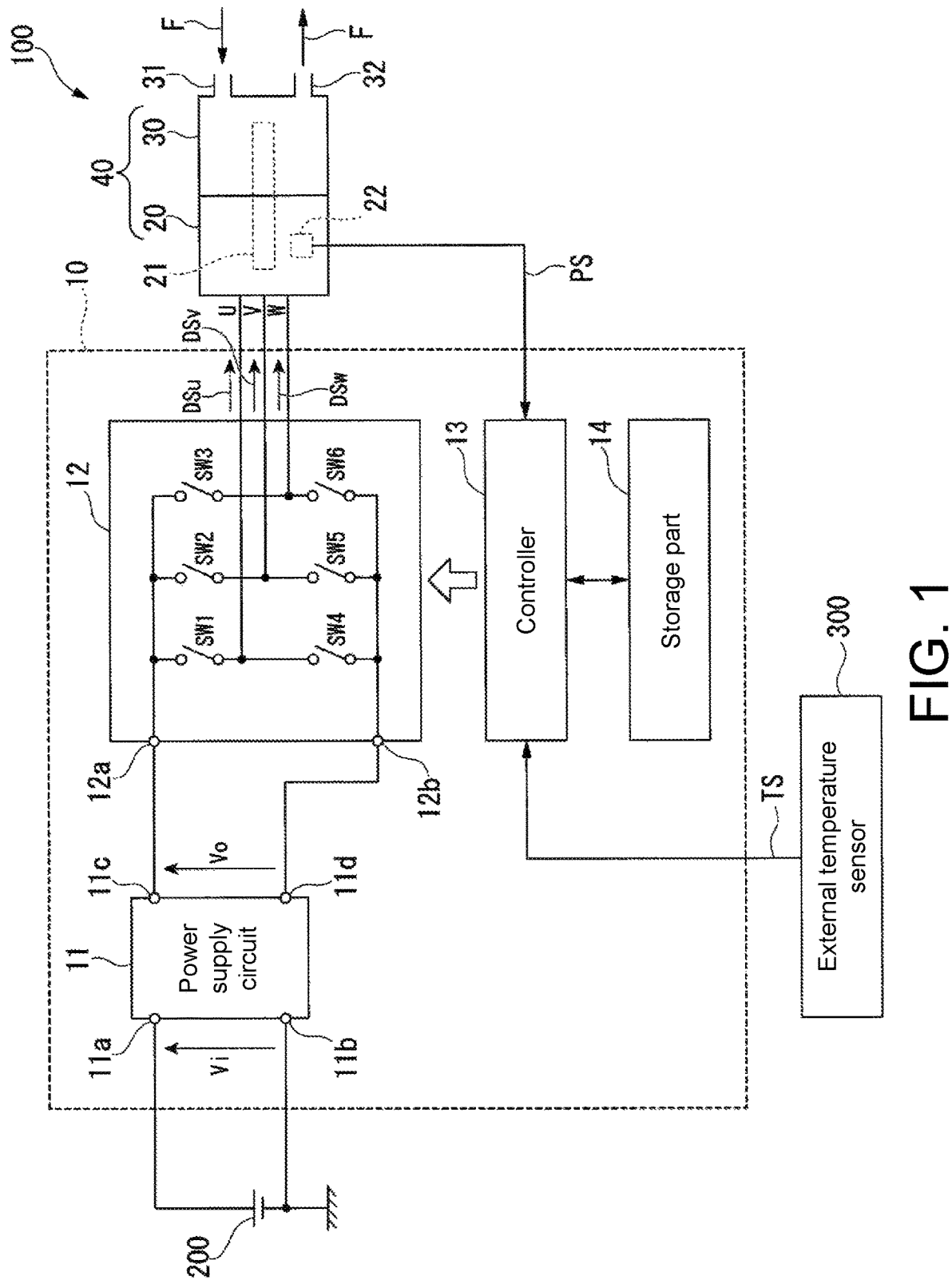
FIG. 1 is a circuit block diagram schematically showing an electric oil pump device including a motor driving device according to the present embodiment.

Hereinafter, an embodiment of the disclosure will be described in detail with reference to the drawings. FIG. 1 is a circuit block diagram schematically showing an electric oil pump device 100 including a motor driving device 10 according to the present embodiment. As shown in FIG. 1, the electric oil pump device 100 includes the motor driving device 10 and an electric oil pump 40. The electric oil pump 40 includes a motor 20 and a pump 30. The electric oil pump device 100 is a device that supplies oil to a transmission mounted on a hybrid vehicle, for example.

The motor driving device 10 is a device that drives the motor 20 of the electric oil pump 40. The motor 20 is, for example, a three-phase brushless DC motor. The motor 20 has a shaft 21 that is rotatably supported, and a position sensor 22 that detects the rotational position of the shaft 21. Although not shown in FIG. 1, the motor 20 has a stator including a U-phase coil, a V-phase coil, and a W-phase coil. The position sensor 22 detects the rotational position of the shaft 21 and outputs a shaft position signal PS indicating the detection result to the motor driving device 10. A Hall sensor, an encoder, or a resolver, for example, may be used as the position sensor 22.

The pump 30 is positioned on one axial side of the shaft 21 of the motor 20 and is driven by the motor 20 via the shaft 21 to discharge oil F. The pump 30 has an oil suction port 31 and an oil discharge port 32. The oil F is sucked into the pump 30 from the oil suction port 31 and then discharged from the oil discharge port 32 to the transmission side (not shown). Thus, the electric oil pump 40 is configured by connecting the pump 30 and the motor 20.

The motor driving device 10 includes a power supply circuit 11, an inverter circuit 12 (driver), a controller 13, and a storage part 14. The motor driving device 10 is electrically connected to the motor 20, a battery 200 which is an external power source, and an external temperature sensor 300. The battery 200 and the external temperature sensor 300 are not components of the electric oil pump device 100 of the present embodiment. The external temperature sensor 300 detects an environmental temperature and outputs an environmental temperature signal TS indicating the environmental temperature to the motor driving device 10.

The power supply circuit 11 has a first input terminal 11a, a second input terminal 11b, a first output terminal 11c, and a second output terminal 11d. The first input terminal 11a of the power supply circuit 11 is electrically connected to the positive terminal of the battery 200. The second input terminal 11b of the power supply circuit 11 is electrically connected to the negative terminal of the battery 200. The first output terminal 11c of the power supply circuit 11 is electrically connected to the first input terminal 12a of the inverter circuit 12. The second output terminal 11d of the power supply circuit 11 is electrically connected to the second input terminal 12b of the inverter circuit 12.

The power supply circuit 11 converts the DC voltage Vi input from the battery 200 into the DC voltage Vo having a voltage value required for driving the motor 20, and outputs the DC voltage Vo to the inverter circuit 12. The DC voltage Vi input from the battery 200 is a voltage applied between the first input terminal 11a and the second input terminal 11b. The DC voltage Vo output from the power supply circuit 11 is a voltage generated between the first output terminal 11c and the second output terminal 11d.

The power supply circuit 11 has a fail-safe function of measuring the current value flowing through the inverter circuit 12, that is, the output current value output from the motor driving device 10 to the motor 20, and stopping the current supply of the inverter circuit 12 to the motor 20 by stopping the voltage output to the inverter circuit 12 when the output current value exceeds an upper limit value. Although not shown in FIG. 1, the power supply circuit 11 also generates a power supply voltage required for operating the controller 13 and the storage part 14, and outputs the generated power supply voltage to the controller 13 and the storage part 14.

The inverter circuit 12 is a driving circuit that outputs a drive signal for driving the motor 20 to the motor 20. Specifically, the inverter circuit 12 outputs a pulse-width modulated drive signal DSu to the U-phase coil (not shown) of the motor 20. In addition, the inverter circuit 12 outputs a pulse-width modulated drive signal DSv to the V-phase coil (not shown) of the motor 20. Further, the inverter circuit 12 outputs a pulse-width modulated drive signal DSw to the W-phase coil (not shown) of the motor 20.

The inverter circuit 12 includes a first input terminal 12a, a second input terminal 12b, a first switching element SW1, a second switching element SW2, a third switching element SW3, a fourth switching element SW4, a fifth switching element SW5, and a sixth switching element SW6.

The first input terminal 12a of the inverter circuit 12 is electrically connected to the first output terminal 11c of the power supply circuit 11. The second input terminal 12b of the inverter circuit 12 is electrically connected to the second output terminal 11d of the power supply circuit 11. The DC voltage Vo output from the power supply circuit 11 is applied between the first input terminal 12a and the second input terminal 12b.

The first switching element SW1 to the sixth switching element SW6 are high-power power transistors such as MOS-FETs. The first switching element SW1 and the fourth switching element SW4 are connected in series. The second switching element SW2 and the fifth switching element SW5 are connected in series. The third switching element SW3 and the sixth switching element SW6 are connected in series.

One end of each of the first switching element SW1, the second switching element SW2, and the third switching element SW3 is electrically connected to the first input terminal 12a. One end of each of the fourth switching element SW4, the fifth switching element SW5, and the sixth switching element SW6 is electrically connected to the second input terminal 12b.

The U-phase coil of the motor 20 is electrically connected between the first switching element SW1 and the fourth switching element SW4. The V-phase coil of the motor 20 is electrically connected between the second switching element SW2 and the fifth switching element SW5. The W-phase coil of the motor 20 is electrically connected between the third switching element SW3 and the sixth switching element SW6.

The on/off states of the first switching element SW1 to the sixth switching element SW6 are controlled by a control signal input from the controller 13 which will be described later. By controlling the on/off states of the first switching element SW1 to the sixth switching element SW6, the duty ratios of the drive signal DSu, the drive signal DSv, and the drive signal DSw output from the inverter circuit 12 to the motor 20 are controlled. The rotation speed of the motor 20 is able to be controlled by controlling the duty ratios of the drive signal DSu, the drive signal DSv, and the drive signal DSw.

The controller 13 is electrically connected to the inverter circuit 12, the storage part 14, the position sensor 22 of the motor 20, and the external temperature sensor 300. The controller 13 generates the control signal for controlling the on/off states of the first switching element SW1 to the sixth switching element SW6 based on the shaft position signal PS input from the position sensor 22 and the environmental temperature signal TS input from the external temperature sensor 300, and outputs the generated control signal to each switching element. In other words, the controller 13 controls the duty ratios of the drive signal DSu, the drive signal DSv, and the drive signal DSw output from the inverter circuit 12 to the motor 20 by controlling the on/off states of the first switching element SW1 to the sixth switching element SW6. Thereby, the controller 13 is able to control the rotation speed of the motor 20.

As described above, in the present embodiment, the controller 13 controls the motor 20 by PWM control that controls the rotation speed of the motor 20 by changing the duty ratios of the drive signal DSu, the drive signal DSv, and the drive signal DSw. Specifically, the controller 13 is able to increase the rotation speed of the motor 20 by increasing the duty ratios of the drive signal DSu, the drive signal DSv, and the drive signal DSw. In addition, the controller 13 is able to reduce the rotation speed of the motor 20 by reducing the duty ratios of the drive signal DSu, the drive signal DSv, and the drive signal DSw. Within the ranges of the duty ratios of the drive signal DSu, the drive signal DSv, and the drive signal DSw adjusted by the controller 13 of the present embodiment, the values of the duty ratios and the rotation speed of the motor 20 are, for example, proportional.

Although details will be described later, the controller 13 controls the duty ratios of the drive signal DSu, the drive signal DSv, and the drive signal DSw based on three control parameters which are an initial duty ratio, a duty ratio increasing speed, and a target duty ratio. In addition, the controller 13 has a normal control mode in which each of the above three control parameters is a predetermined value, and a cryogenic control mode in which at least one of the above three control parameters is a value smaller than that in the normal control mode. The controller 13 of the present embodiment determines whether the environmental temperature is equal to or less than a threshold value based on the environmental temperature signal TS input from the outside, and switches to the normal control mode when the environmental temperature exceeds the threshold value, and switches to the cryogenic control mode when the environmental temperature is equal to or less than the threshold value. The threshold value is, for example, −10° C. Such a controller 13 may be realized by a microcomputer such as a CPU (central processing unit).

The storage part 14 is a semiconductor memory having a ROM and a RAM. The storage part 14 stores three control parameters which are the initial duty ratio X1, the duty ratio increasing speed X2, and the target duty ratio X3 for the normal control mode in advance, and stores three control parameters which are the initial duty ratio Y1, the duty ratio increasing speed Y2, and the target duty ratio Y3 for the cryogenic control mode in advance.

Figure 2:
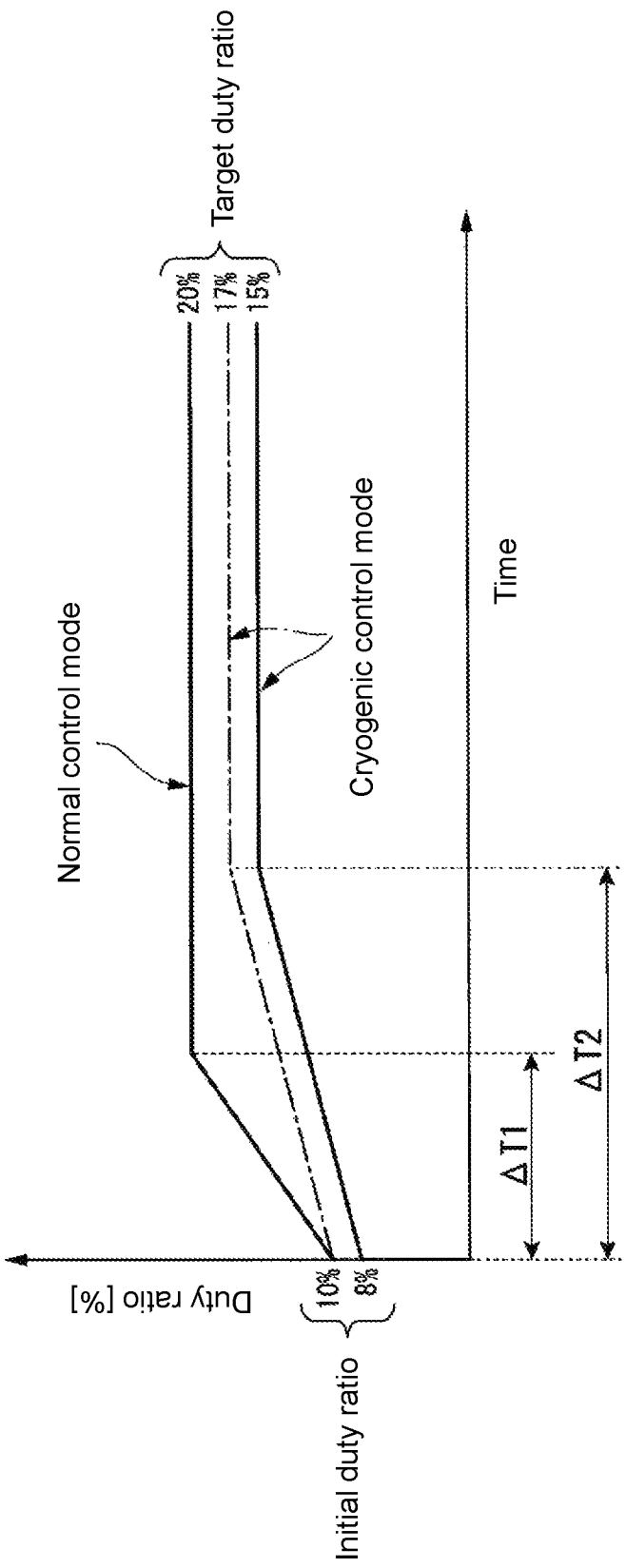
FIG. 2 is an explanatory diagram related to three control parameters which are an initial duty ratio, a duty ratio increasing speed, and a target duty ratio.

As shown in FIG. 2, in the present embodiment, in the storage part 14, "10%" is stored as the initial duty ratio X1 for the normal control mode, and "20%" is stored as the target duty ratio X3 for the normal control mode. The duty ratio increasing speed X2 for the normal control mode is expressed by the following equation (1). ΔT1 is the time for the duty ratio to reach the target duty ratio X3 from the initial duty ratio X1.

$$X2=(X3-X1)/\Delta T1 \quad (1)$$

Further, in the storage part 14, "8%" is stored as the initial duty ratio Y1 for the cryogenic control mode, and "15%" is stored as the target duty ratio Y3 for the cryogenic control mode. The duty ratio increasing speed Y2 for the cryogenic control mode is expressed by the following equation (2). ΔT2 is the time for the duty ratio to reach the target duty ratio Y3 from the initial duty ratio Y1.

$$Y2=(Y3-Y1)/\Delta T2 \quad (2)$$

In the present embodiment, the absolute value of the difference between the initial duty ratio X1 and the target duty ratio X3 in the normal control mode is "10%". Further, the absolute value of the difference between the initial duty ratio Y1 and the target duty ratio Y3 in the cryogenic control mode is "7%".

As described above, in the present embodiment, in the cryogenic control mode, all the three control parameters, that is, the initial duty ratio, the duty ratio increasing speed, and the target duty ratio, are values smaller than those in the normal control mode. In addition, the absolute value of the difference between the initial duty ratio Y1 and the target duty ratio Y3 in the cryogenic control mode is smaller than the absolute value of the difference between the initial duty ratio X1 and the target duty ratio X3 in the normal control mode.

The operation of the motor driving device 10 configured as described above will be described hereinafter. When the DC voltage Vi is input from the battery 200 to the motor driving device 10, the power supply circuit 11 outputs the DC voltage Vo to the inverter circuit 12 and outputs the power supply voltage to the controller 13 and the storage part 14.

The controller 13 is activated when receiving supply of the power supply voltage from the power supply circuit 11, and determines whether the environmental temperature is equal to or less than the threshold value (−10° C.) based on the environmental temperature signal TS input from the external temperature sensor 300. If the environmental temperature exceeds the threshold value, the controller 13 enters the normal control mode and reads the initial duty ratio X1, the duty ratio increasing speed X2, and the target duty ratio X3 for the normal control mode from the storage part 14.

Then, the controller 13 controls the duty ratios of the drive signal DSu, the drive signal DSv, and the drive signal DSw output from the inverter circuit 12 to the motor 20 by controlling the on/off state of each switching element of the inverter circuit 12 based on the initial duty ratio X1, the duty ratio increasing speed X2, and the target duty ratio X3 for the normal control mode. Thus, the duty ratios of the drive signal DSu, the drive signal DSv, and the drive signal DSw output from the inverter circuit 12 to the motor 20 change like the pattern during the normal control mode shown in FIG. 2.

In addition, if the environmental temperature is equal to or less than the threshold value, the controller 13 enters the cryogenic control mode and reads the initial duty ratio Y1, the duty ratio increasing speed Y2, and the target duty ratio Y3 for the cryogenic control mode from the storage part 14.

Then, the controller 13 controls the duty ratios of the drive signal DSu, the drive signal DSv, and the drive signal DSw output from the inverter circuit 12 to the motor 20 by controlling the on/off state of each switching element of the inverter circuit 12 based on the initial duty ratio Y1, the duty ratio increasing speed Y2, and the target duty ratio Y3 for the cryogenic control mode. Thus, the duty ratios of the drive signal DSu, the drive signal DSv, and the drive signal DSw output from the inverter circuit 12 to the motor 20 change like the pattern during the cryogenic control mode shown in FIG. 2.

Here, in the state of an extremely low temperature of −10° C. or less, for example, the viscosity of the oil F becomes extremely high compared with that in the normal temperature state. When the viscosity of the oil F increases, the viscous resistance that the pump 30 receives from the oil F increases, and the torque of the motor 20 required for rotating the pump 30 increases. Therefore, in the cryogenic state, if the duty ratios of the drive signal DSu, the drive signal DSv, and the drive signal DSw output from the inverter circuit 12 to the motor 20 are controlled based on the initial duty ratio X1, the duty ratio increasing speed X2, and the target duty ratio X3 for the normal control mode which are determined on the assumption of the normal temperature state, that is, the state where the viscosity of the oil F is relatively low, the load torque of the motor 20 may increase extremely. As a result, the output current value output from the inverter circuit 12 to the motor 20 may rise and exceed the predetermined upper limit value of the output current value. When the output current value exceeds the upper limit value, the fail-safe function of the power supply circuit 11 may apply and make it impossible to drive the motor 20.

In the present embodiment, the controller 13 has the normal control mode and the cryogenic control mode, and in the cryogenic control mode, at least one of the three control parameters which are the initial duty ratio, the duty ratio increasing speed, and the target duty ratio is a value smaller than that in the normal control mode. Therefore, in the cryogenic control mode, the duty ratio of each of the drive signal DSu, the drive signal DSv, and the drive signal DSw is easily reduced as compared with the normal control mode. Since the duty ratios of the drive signal DSu, the drive signal DSv, and the drive signal DSw in the cryogenic control mode are easily reduced to be smaller than those in the normal control mode, by setting the controller 13 to the cryogenic control mode, it is easy to set the rotation speed of the motor 20 less than that in the normal control mode. When the rotation speed of the motor 20 decreases, the rotation speed of the pump 30 also decreases. Here, since the viscous resistance is proportional to the speed, the viscous resistance received from the oil F decreases as the rotation speed of the pump 30 decreases. Thus, even if the viscosity of the oil F is relatively high, the viscous resistance received by the pump 30 is able to be reduced, and the load torque of the motor 20 is able to be suppressed from increasing. Therefore, in the cryogenic state where the environmental temperature is −10° C. or less, for example, by setting the controller 13 to the cryogenic control mode, even if the viscosity of the oil F is relatively high, the load torque of the motor 20 is able to be suppressed from increasing, and the output current value output from the inverter circuit 12 to the motor 20 is able to be suppressed from increasing. By suppressing the increase of the output current value, it is possible to prevent the fail-safe function of the power supply circuit 11 from applying, and it is possible to prevent the motor 20 from becoming unable to be driven. Thus, according to the present embodiment, the motor 20 is able to be stably rotated even in the cryogenic state to supply the hydraulic pressure.

In the present embodiment, three control parameters which are the initial duty ratio, the duty ratio increasing speed, and the target duty ratio are separately prepared for the normal control mode and the cryogenic control mode, and these control parameters are selectable according to the environmental temperature.

Specifically, in the present embodiment, the controller 13 determines whether the environmental temperature is equal to or less than the threshold value based on the environmental temperature signal TS input from the outside, and switches to the normal control mode when the environmental temperature exceeds the threshold value, and switches to the cryogenic control mode when the environmental temperature is equal to or less than the threshold value. Therefore, when the environmental temperature is relatively high and the viscosity of the oil F is relatively low, the rotation speed of the motor 20 is suitably increased by the normal control mode so that the pump 30 is able to suitably feed the oil F. On the other hand, when the environmental temperature is relatively low and the viscosity of the oil F is relatively high, the rotation speed of the motor 20 is suppressed by the cryogenic control mode so as to suppress the load torque of the motor 20 from increasing. Thus, in the present embodiment, by switching between the normal control mode and the cryogenic control mode according to the environmental temperature, the increase of the load torque, that is, the rise of the output current value, is able to be suppressed even in the cryogenic state, and it is possible to perform smooth and stable motor control without stopping the rotation of the motor 20.

In the present embodiment, in the cryogenic control mode, all the three control parameters which are the initial duty ratio, the duty ratio increasing speed, and the target duty ratio are values smaller than those in the normal control mode. Therefore, as shown in FIG. 2, if each mode is started at the same time, the duty ratios of the drive signal DSu, the drive signal DSv, and the drive signal DSw in the cryogenic control mode are able to be set smaller than the duty ratios of the drive signal DSu, the drive signal DSv, and the drive signal DSw in the normal control mode at any time. By setting the duty ratios of the drive signal DSu, the drive signal DSv, and the drive signal DSw in the cryogenic control mode smaller than those in the normal control mode, during the entire period in which the motor 20 is controlled by the cryogenic control mode, the rotation speed of the motor 20 is able to be set smaller than that when the motor 20 is controlled by the normal control mode. Thus, it is possible to more appropriately suppress the load torque of the motor 20 from increasing.

Specifically, in the present embodiment, when the environmental temperature is greater than −10° C., for example, the duty ratios of the drive signal DSu, the drive signal DSv, and the drive signal DSw output from the inverter circuit 12 to the motor 20 are controlled based on the initial duty ratio X1, the duty ratio increasing speed X2, and the target duty ratio X3 for the normal control mode which are determined on the assumption that the viscosity of the oil F is relatively low. In addition, when the environmental temperature is −10° C. or less, for example, the duty ratios of the drive signal DSu, the drive signal DSv, and the drive signal DSw output from the inverter circuit 12 to the motor 20 are controlled based on the initial duty ratio Y1, the duty ratio increasing speed Y2, and the target duty ratio Y3 for the cryogenic control mode which are determined on the assumption that the viscosity of the oil F is relatively high.

Although the above embodiment illustrates that all the three control parameters for the cryogenic control mode are values smaller than those in the normal control mode, it is possible to obtain the effect of suppressing the increase of the load torque (that is, the rise of the output current value) if at least one of the three control parameters for the cryogenic control mode is a value smaller than that in the normal control mode. However, in order to maximize this effect, it is preferable that all the three control parameters for the cryogenic control mode are values smaller than those in the normal control mode.

For example, as indicated by the one-dot chain line shown in FIG. 2, the initial duty ratio Y1 for the cryogenic control mode may be set to the same value (10%) as for the normal control mode, and the duty ratio increasing speed Y2 and the target duty ratio Y3 (17%) may be set to values smaller than those for the normal control mode. Alternatively, in the cryogenic control mode, two of the three control parameters, the initial duty ratio and the target duty ratio, may be values smaller than those in the normal control mode. In this case, it is still possible to obtain the effect of suppressing the increase of the load torque, that is, the rise of the output current value.

The above embodiment illustrates that the absolute value of the difference between the initial duty ratio Y1 and the target duty ratio Y3 in the cryogenic control mode is smaller than the absolute value of the difference between the initial duty ratio X1 and the target duty ratio X3 in the normal control mode. Thus, the difference between the duty ratios of the drive signals from when the motor 20 is driven to when the rotation converges is able to be set smaller. As a result, it is possible to obtain the effect that the rise of the output current value of the cryogenic control mode is suppressed more than the rise of the output current value of the normal control mode.

Figure 3:
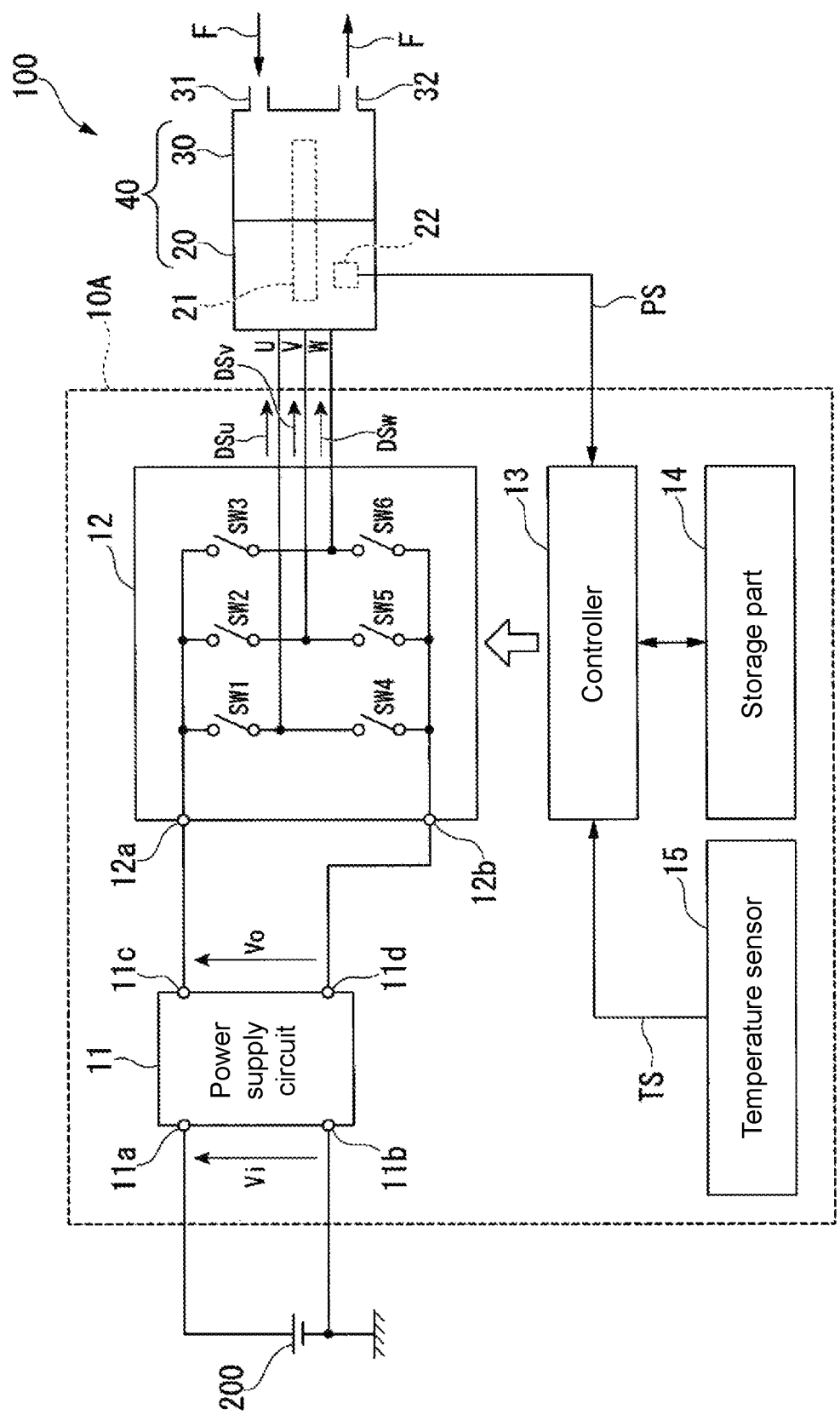
FIG. 3 is a diagram showing the first modified example of the motor driving device according to the present embodiment.

Nevertheless, the disclosure is not limited to the above embodiment, and the configurations described in this specification may be combined as appropriate within a range where no contradiction occurs. For example, although the above embodiment illustrates a configuration that the information of the environmental temperature is supplied from the external temperature sensor 300 to the controller 13 of the motor driving device 10, the motor driving device may further include a temperature sensor 15, like the motor driving device 10A shown in FIG. 3.

The temperature sensor 15 detects the environmental temperature and outputs the environmental temperature signal TS indicating the environmental temperature to the controller 13. Any sensor that is able to output a signal having a correlation with the environmental temperature may be used as the temperature sensor 15. In this case, the controller 13 determines whether the environmental temperature is equal to or less than the threshold value based on the environmental temperature signal TS input from the temperature sensor 15, and switches to the normal control mode when the environmental temperature exceeds the threshold value, and switches to the cryogenic control mode when the environmental temperature is equal to or less than the threshold value. By adopting such a configuration, the entire motor driving device including temperature detection is able to be completed by itself.

Figure 4:
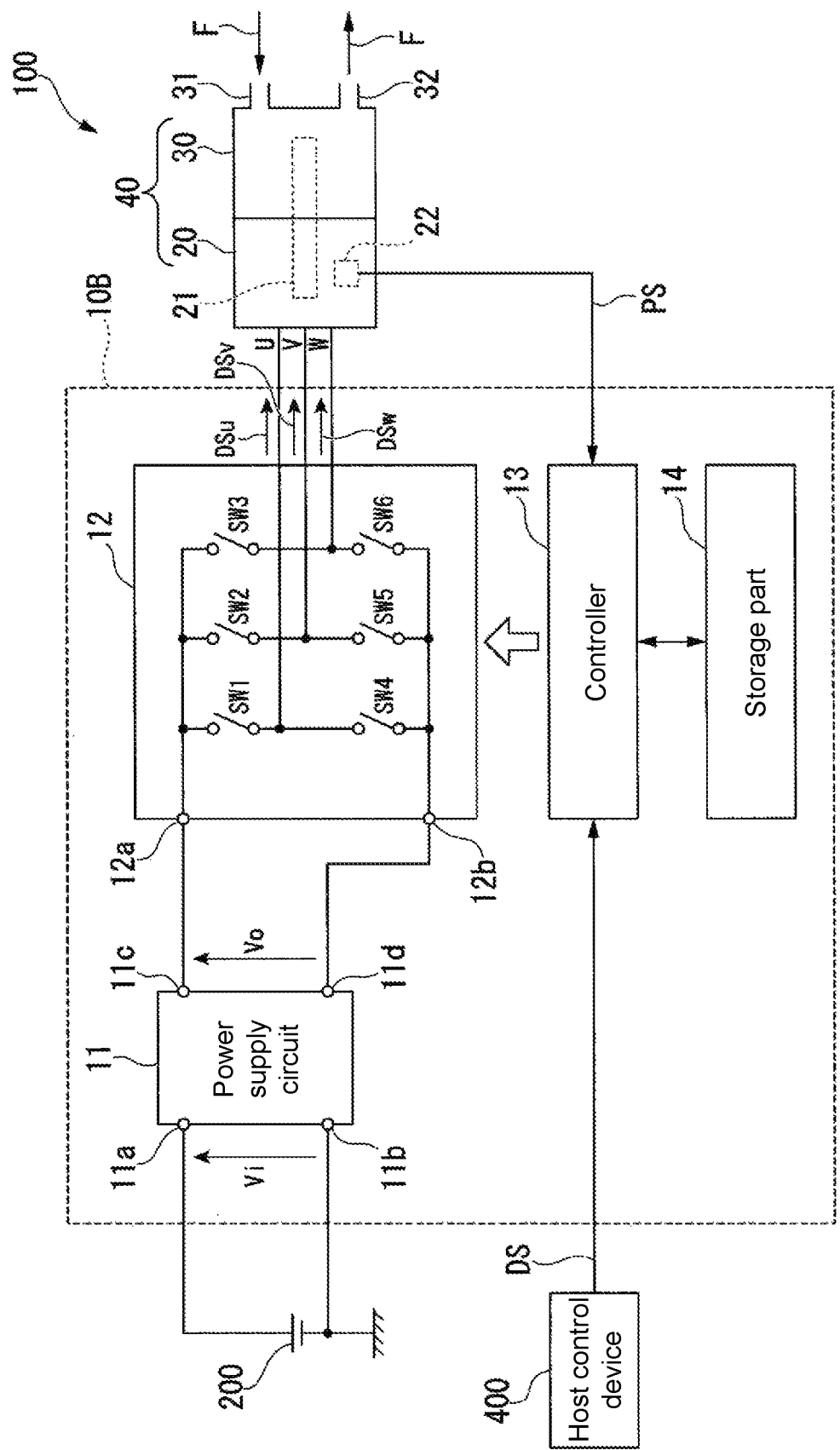
FIG. 4 is a diagram showing the second modified example of the motor driving device according to the present embodiment.

Further, like the motor driving device 10B shown in FIG. 4, the control mode may be switched according to an operation command signal DS input from an external host control device 400. In this case, the controller 13 switches to the normal control mode when the duty ratio of the operation command signal DS input from the host control device 400 falls within a first range, and switches to the cryogenic control mode when the duty ratio of the operation command signal DS falls within a second range. By adopting such a configuration, it is not necessary to grasp the environmental temperature on the side of the motor driving device, the device cost is reduced, and it is possible to reduce the weight and size of the motor driving device.

Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric oil pump device comprising:
a motor comprising a shaft;
a pump located on one axial side of the shaft and driven by the motor via the shaft to discharge oil;
a driver outputting a drive signal for driving the motor to the motor; and
a controller controlling a duty ratio of the drive signal based on three control parameters which are an initial duty ratio, a duty ratio increasing speed, and a target duty ratio,
wherein the controller has a normal control mode in which each of the three control parameters is a predetermined value, and a cryogenic control mode in which the motor is stably rotated in a cryogenic state, and at least the target duty ratio in the cryogenic control mode is a smaller value than the target duty ratio in the normal control mode,
wherein the target duty ratio in the normal control mode is greater than the initial duty ratio in the normal control mode,
wherein the target duty ratio in the cryogenic control mode is greater than the initial duty ratio in the cryogenic control mode.

2. The electric oil pump device according to claim 1, wherein the controller determines whether an environmental temperature is equal to or less than a threshold value based on an environmental temperature signal input from outside, and switches to the normal control mode when the environmental temperature exceeds the threshold value, and switches to the cryogenic control mode when the environmental temperature is equal to or less than the threshold value.

3. The electric oil pump device according to claim 1, further comprising:
a sensor detecting an environmental temperature and outputting an environmental temperature signal indicating the environmental temperature to the controller,
wherein the controller determines whether the environmental temperature is equal to or less than a threshold value based on the environmental temperature signal input from the sensor, and switches to the normal control mode when the environmental temperature exceeds the threshold value, and switches to the cryogenic control mode when the environmental temperature is equal to or less than the threshold value.

4. The electric oil pump device according to claim 1, wherein the controller switches to the normal control mode when a duty ratio of an operation command signal input from outside falls within a first range, and switches to the cryogenic control mode when the duty ratio of the operation command signal falls within a second range.

5. The electric oil pump device according to claim 1, wherein in the cryogenic control mode, two of the three control parameters, the initial duty ratio and the target duty ratio, are smaller values than in the normal control mode.

6. The electric oil pump device according to claim 1, wherein in the cryogenic control mode, all of the three control parameters are smaller values than in the normal control mode.

7. The electric oil pump device according to claim 1, wherein an absolute value of a difference between the initial duty ratio and the target duty ratio in the cryogenic control mode is smaller than an absolute value of a difference between the initial duty ratio and the target duty ratio in the normal control mode.

* * * * *